United States Patent [19]
Yamamoto

[11] Patent Number: 5,961,410
[45] Date of Patent: Oct. 5, 1999

[54] AUTOTENSIONER

[75] Inventor: Ken Yamamoto, Shizuoka, Japan

[73] Assignee: NTN Corporation, Osaka, Japan

[21] Appl. No.: 08/950,750

[22] Filed: Oct. 15, 1997

[30] Foreign Application Priority Data

Oct. 21, 1996 [JP] Japan ............................ 8-278141

[51] Int. Cl.$^6$ .................................................. F16H 7/08
[52] U.S. Cl. ......................... 474/110; 474/135; 474/138
[58] Field of Search .................................. 474/101, 110, 474/109, 136, 138, 135, 133; 74/459

[56] References Cited

U.S. PATENT DOCUMENTS

| | | | |
|---|---|---|---|
| 4,472,161 | 9/1984 | Ojima ........................................ | 474/111 |
| 4,708,696 | 11/1987 | Kimura et al. ....................... | 474/138 X |
| 4,863,417 | 9/1989 | Kimata et al. ....................... | 474/111 X |
| 5,154,091 | 10/1992 | Bianco ...................................... | 74/459 |
| 5,653,651 | 8/1997 | Kawashima et al. .................... | 474/110 |
| 5,713,809 | 2/1998 | Yamamoto et al. .................... | 474/110 |

*Primary Examiner*—Lenard A. Footland
*Assistant Examiner*—Marcus Charles
*Attorney, Agent, or Firm*—Wenderoth, Lind & Ponack, L.L.P.

[57] ABSTRACT

An autotensioner which can keep the tension in a belt at a constant level from the start of an engine. The autotensioner includes a cylinder having a top opening closed by an oil seal to prevent leakage of hydraulic oil in the cylinder. A rod slidably extends through the oil seal and is biased upward by a rod spring. At the bottom end of the rod is a hydraulic damper. A screw rod is slidably fitted on a small-diameter portion at the bottom end of the rod and is urged by a return spring against a shoulder formed on the rod. A nut member is axially immovably mounted in the cylinder while kept in mesh with a male thread formed on the screw rod. When the engine is cut, the belt may be stretched according to the positions of the cam on camshafts. If this happens, the rod is pushed inwardly by the belt. This rod pushing force is borne by pressure flanks of the threads at the thread engagement portions of the screw rod and the nut member to prevent the retraction of the rod. Since the belt is tensioned while the engine is not running, it will never slacken when the engine is restarted.

10 Claims, 3 Drawing Sheets

AUTOTENSIONER

BACKGROUND OF THE INVENTION

This invention relates to an autotensioner for keeping the tension in a belt of a belt transmission at a constant level.

An automotive internal combustion engine has a belt transmission. While the engine is running, the tension in the belt of the belt transmission tends to fluctuate rather violently due to changes in distance between pulleys resulting from thermal expansion of the engine body, or variations in torque. To prevent such variations in belt tension, i.e. to keep the tension in the belt at a constant level, a hydraulic autotensioner is used.

FIG. 4 shows a conventional autotensioner of this type. The autotensioner shown comprises a cylinder 40 filled with hydraulic oil and having its top opening closed by a seal member 41, a rod 42 slidably extending through the seal member 41, a rod spring 43 biasing the rod 42 outwardly of the cylinder 40, and a hydraulic damper 44 provided at the bottom end of the rod 42.

The hydraulic damper 44 includes a plunger 45 mounted in the cylinder 40 so as to be slidable along its inner peripheral surface. The plunger 45 defines a pressure chamber 46 and a reservoir chamber 47 in the cylinder 40. The chambers 46 and 47 communicate with each other through a passage 48 formed in the plunger 45. The damper 44 further includes a check valve 49 for opening and closing the passage 48.

Biased by the rod spring 43, the rod 42 is pressed against a roller arm 33 pivotable about a pin 32, so that its tension roller 34 is pressed against a belt A, thus tensioning the belt.

While the engine is running, the belt A vibrates due to fluctuating torque. The rod 42 is thus intermittently pushed in by the belt A. When the rod 42 is pushed in, the pressure in the pressure chamber 46 exceeds the pressure in the reservoir chamber 47, and the passage 48 is closed by the check valve 49. The pushing force acting on the rod 42 is thus damped by the hydraulic oil sealed in the pressure chamber 46.

While the pushing force acting on the rod 42 is greater than the force of the rod spring 43, hydraulic oil in the pressure chamber 46 is allowed to leak through a gap present between the outer surface of the plunger 45 and the inner surface of the cylinder 40 into the reservoir chamber 47, so that the rod 42 and the plunger 46 will lower slowly until the pushing force on the rod 42 balances with the force of the spring 43. This prevents excessive tensioning of the belt.

When the belt A slackens, the rod 42 is pushed out by the rod spring 43. As soon as the rod 42 begins to move outward, the pressure in the pressure chamber 46 drops below the pressure in the reservoir chamber 47, so that the check valve 49 opens the passage 48, allowing the rod 42 to move quickly outwardly following the slackening of the belt A. The slackened belt is thus quickly tensioned again.

Even after the engine has been cut, the belt may remain tensioned according to the positions of the cams on camshafts.

If the belt tension remains high after the engine has been cut, the rod 42 is urged into the cylinder 40 by the belt, so that hydraulic oil in the pressure chamber 46 leaks through the gap between the plunger 45 and the inner periphery of the cylinder 40 into the reservoir chamber 47 until the plunger 45 sinks rather deep into the cylinder.

When the engine is restarted in this state, the cams move and the belt will slacken quickly. Thus, the rod 42, which has been pushed deep into the cylinder, has to move a long distance until it is pressed against the belt. While the rod is protruding chasing the belt, the belt is free to vibrate. It thus takes a long time to stabilize the belt immediately after the engine has been started.

An object of this invention is to provide an autotensioner having a means for preventing its rod from being pushed in if the belt is tensioned according to the positions of the cams on camshafts when the engine is cut, thereby keeping the belt from slackening when the engine is restarted, namely, stabilizing the movement of the belt at the start of the engine.

SUMMARY OF THE INVENTION

According to this invention, there is an autotensioner comprising a cylinder having a closed bottom and an open top closed by a sealing member and filled with hydraulic oil, a rod slidably extending through the sealing member, a rod spring biasing the rod outwardly of the cylinder, and a hydraulic damper provided under the rod for damping the pushing force applied to the rod. The rod is formed with a helical male thread formed on outer periphery thereof. And a nut member is axially immovably mounted in the cylinder and formed in inner peripheral surface thereof with a helical female thread so as to be in mesh with the male thread on the rod.

The screw rod may be an integral part of the rod, or may be a separate member fixed to the rod or slidably mounted on a small-diameter portion of the rod. If the screw rod is slidably mounted on the rod, it should be pressed by a pressure spring against a shoulder formed at the top end of the small-diameter portion of the rod.

Other features and objects of the present invention will become apparent from the following description made with reference to the accompanying drawings, in which:

DETAILED DESCRIPTION OF THE PREFERRED EMBODIMENT

Figure 1:
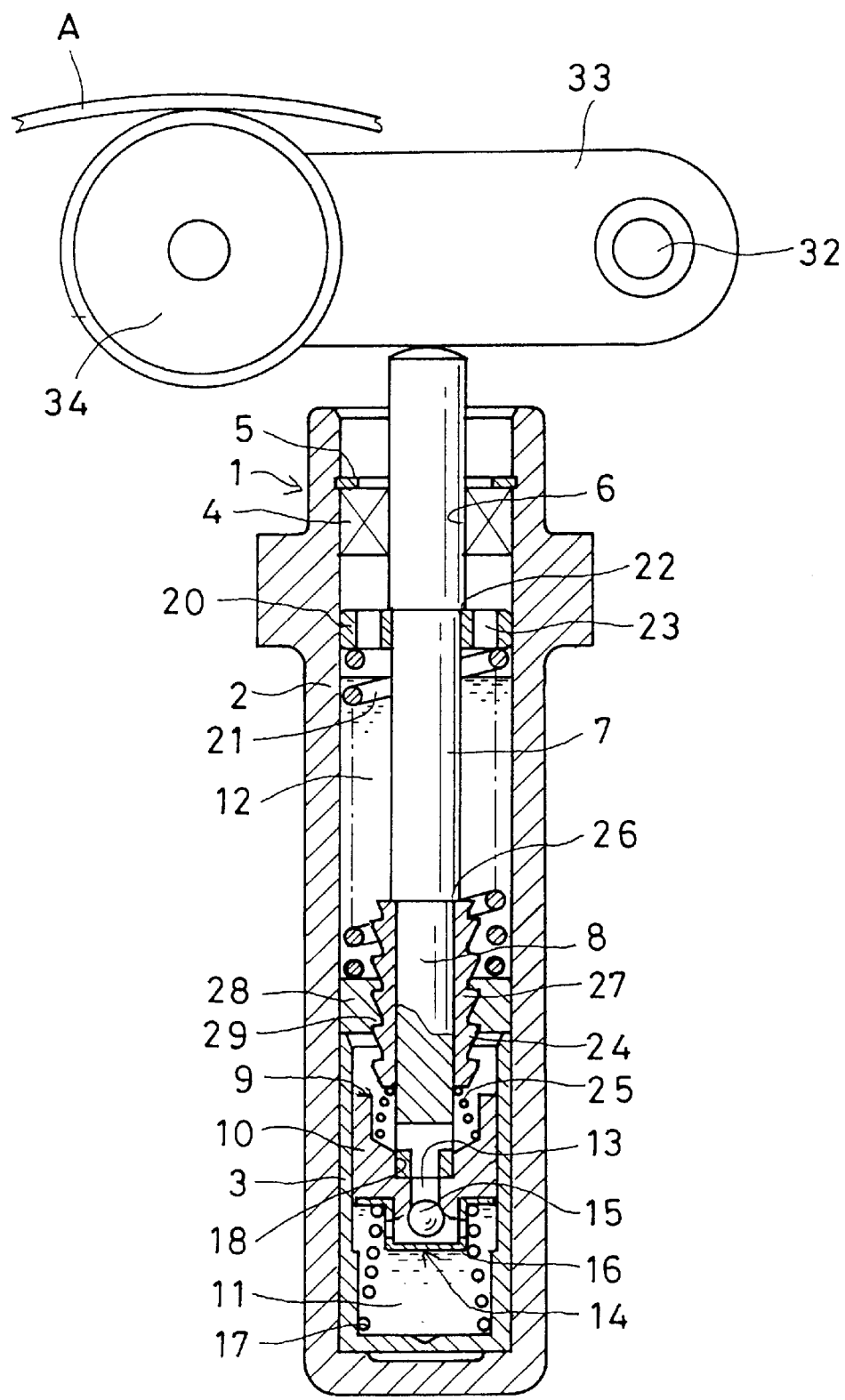
FIG. 1 is a front view in vertical section of an embodiment of an autotensioner according to this invention.
Figure 2:
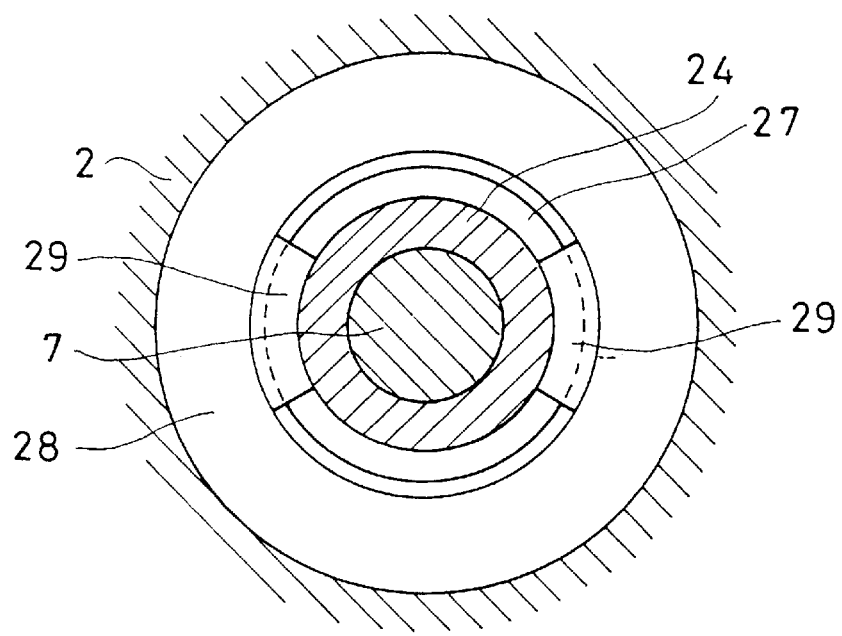
FIG. 2 is a sectional view taken along line II—II of FIG. 1.
Figure 3:
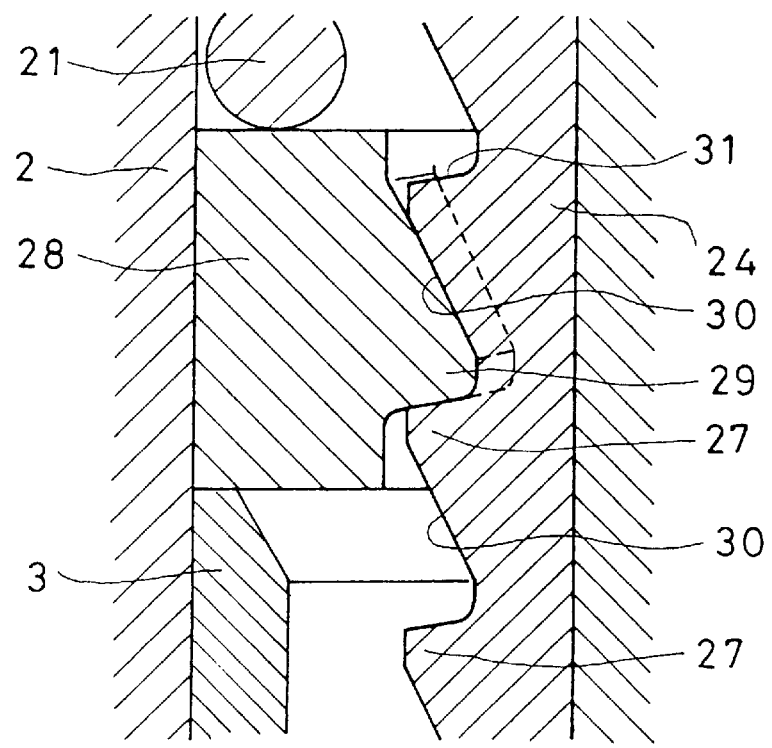
FIG. 3 is an enlarged sectional view of a thread engagement portion of a screw rod and a nut member of FIG. 1.
Figure 4:
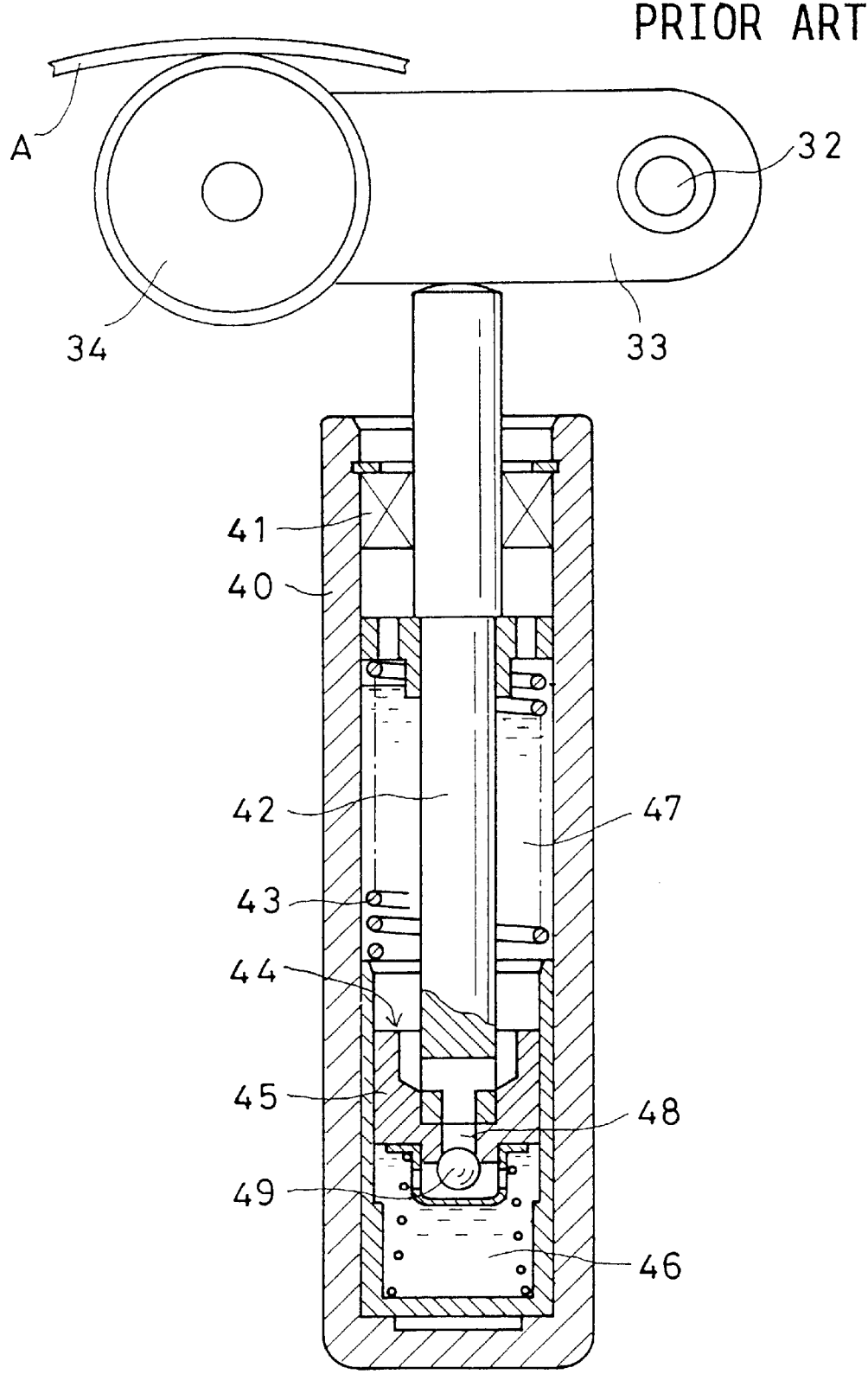
FIG. 4 is a front view in vertical section of a conventional autotensioner.

Referring to FIGS. 1–3, the embodiment of this invention is described.

FIG. 1 shows a cylinder 1 having a closed bottom and comprising a cylindrical casing 2 made of an aluminum alloy, and a steel sleeve 3 inserted in the casing 2. The cylinder 1 has a top opening closed by a seal member or oil seal 4. A snap ring 5 prevents the oil seal 4 from coming out. A rod 7 slidably extends through a hole 6 formed in the oil seal 4.

The rod 7 has a lower small-diameter portion 8. Provided at the bottom of the small-diameter portion 8 is a hydraulic damper 9 for damping vibrations of the rod 7 transmitted from the belt A.

The hydraulic damper 9 includes a plunger 10 provided at the bottom of the small-diameter portion 8 of the rod 7. The plunger 10 defines a pressure chamber 11 and a reservoir chamber 12 in the cylinder 1. The chambers 11 and 12 communicate with each other through a passage 13 formed in the plunger 10 and opened and closed by a check valve 14.

The check valve 14 comprises a check ball 15 for opening and closing the bottom opening of the passage 13, and a retainer 16 for limiting the degree of opening of the passage 13 by limiting the movement of the ball 15. The retainer 16 is pressed against the bottom of the plunger 10 by a plunger spring 17.

The hydraulic damper 9 damps the pushing force applied from the belt A to the rod 7 with the hydraulic oil sealed in the pressure chamber 11. While the pushing force is being damped by the damper 9, the pressure in the pressure chamber 11 remains higher than the pressure in the reservoir chamber 12, so that the passage 13 closed by the check valve 14.

In the illustrated Embodiment, the rod 7 a nd the plunger 10 are coupled together by press-fitting or simply inserting the bottom end of the rod 7 in a hole 18 formed in the top of the plunger 10.

In the reservoir chamber 12, a wear ring 20 is fitted on the rod 7. A rod spring 21 is mounted between the wear ring 20 and the top end of the sleeve 3 to press the wear ring 20 against a first shoulder 22 formed on the rod 7 and thus urge the rod 7 outwardly of the cylinder 1.

The wear ring 20 is moved up and down along the inner periphery of the cylinder 1, and is formed with holes 23 through which hydraulic oil in the cylinder 1 can flow.

The cylinder 1 is not completely filled with hydraulic oil but there exists an air layer between the surface of the hydraulic oil and the oil seal. In the embodiment, the hydraulic oil is polyalphaolefin or silicone oil, because their viscosity is less likely to change. But an engine oil or any other oil may be used instead.

A tubular screw rod 24 is slidably fitted on the small-diameter portion 8 of the rod 7. The screw rod 24 is biased upward by a return spring 25 provided thereunder and pressed against a second shoulder 26 at the top end of the small-diameter portion 8.

A nut member 28 is in threaded engagement with male threads 27 formed on the outer periphery of the screw rod 24. The nut member 28 is mounted between the bottom end of the rod spring 21 and the top end of the sleeve 3 so as to be axially immovable.

As shown in FIG. 2, the nut member 28 is a sintered member and is formed with female threads 29 in the diametrically opposite parts on inner peripheral surface thereof. The female threads 29 are in mesh with the male threads 27 on the screw rod 24.

As shown in FIG. 3, the male threads 27 on the screw rod 24 and the female threads 29 on the nut member 28 are serration-shaped and pressure flanks 30 which bear the push-in force from the rod 7 have a greater flank angle than clearance flanks 31. The relationship between the flank angles and lead angles of the flanks 30, 31 is such that the screw rod 24 loosens in the rod protruding direction and locks in the rod push-in direction.

The term "loosen" used herein means that the screw rod 24 can smoothly protrude outwardly while rotating, biased by the return spring 25. The term "lock" herein used means that when the screw rod 24 is strongly pushed by the axial pushing force applied to the rod 7, the screw rod 24 will not move in the rod push-in direction, whereas when the vibrations of the belt A are applied through the rod 7 to the screw rod 24, the screw rod 24 will intermittently and little by little rotate without momentarily locking relative screw motion between the two flanks of the threads, which are repeatedly coming into and out of contact with each other by moving a distance equal to axial gaps formed between the threads of the threadedly engaging portion, so that the screw rod 24 moves slowly in the rod push-in direction until the rod pushing force balances with the force of the return spring 25.

The autotensioner of this invention is mounted with its cylinder 1 vertically positioned to press the roller arm 33 pivotable about the pin 32 with the rod 7 biased outwardly by the rod spring 21. The belt A is thus urged by the tension roller 34 supported on the roller arm 33.

When the belt vibrates due to fluctuating torque and the pushing force is applied to the rod 7 from the belt, the passage 13 is closed by the check valve 14, so that the rod pushing force is damped by the hydraulic oil sealed in the pressure chamber 11.

If the rod pushing force is greater than the sum of the forces of the rod spring 21, return spring 25 and plunger spring 17, hydraulic oil in the pressure chamber 11 flows gradually through the oil leakage gap formed between the sliding surfaces of the plunger 10 and the sleeve 3 into the reservoir chamber 12, so that the rod 7 and the plunger 10 will lower and stop when the rod pushing force balances with the sum of spring forces.

While the rod 7 is lowering, the screw rod 24 lowers together with the rod 7 while rotating.

When the belt A slackens, the rod 7 protrudes outwardly under the force of the rod spring 21, together with the plunger 10, so that the pressure in the pressure chamber 11 drops below the pressure in the reservoir chamber 12. The passage 13 is thus opened by the check valve 14, so that hydraulic oil in the reservoir chamber 12 flows through the passage 13 into the pressure chamber 11. Simultaneously, hydraulic oil above the nut member 28 flows down into a space under the nut member 28 through a gap formed between thread engagement surfaces of the screw rod 24 and the nut member 28 or through a gap between the small-diameter portion 8 and the screw rod 24, allowing the rod 7 to quickly move outwardly and quickly re-stretch the belt A.

While the rod 7 is moving outwardly, the screw rod 24 loosens in the rod-protruding direction and thus moves outwardly together with the rod 7.

When the engine is cut, the belt A may remain stretched according to the positions of the cams on the camshafts. If this happens, the rod 7 is abruptly pushed inwardly. In this state, although the screw rod 24 is pressed by the second shoulder 26 of the rod 7, the rod pushing force applied to the screw rod 24 is borne by the pressure flanks 30 because the relationship between the flanks and leads of the threads at the thread engagement portions of the male and female threads 27, 29 is determined such that the screw rod 24 locks in the rod push-in direction. The screw rod 24 is thus kept from moving in the rod push-in direction, and the belt remains stretched.

Thus, when the engine is restarted, the belt will not slacken. That is, the belt is stable at the start of the engine.

In the preferred embodiment of the invention, the screw rod 24 is slidably mounted on the rod 7. But the screw rod 24 may be integral with or fixed to the rod 7. By forming the screw rod 24 as an integral part of the rod 7, while the rod 7 is moving axially biased by the rod spring 21 or by the roller arm 33, the screw rod moves axially while rotating. This makes it possible to eliminate the use of the return spring 25.

As described, according to this invention, even if the belt is stretched when the engine is cut according to the positions of the cams on the camshafts, the rod is kept from being axially pushed in, and the belt remains stretched. Thus, when the engine is restarted, the belt will not slacken, i.e. will be stable at the start of the engine.

Since the nut member is made of a sintered material, it can be manufactured at a low cost. The female threads formed diametrically opposite to each other in the inner periphery of the nut member define a gap therebetween through which hydraulic oil can flow. Thus, while the plunger is sliding, hydraulic oil over or under the nut member can flow smoothly through this gap into the space under or over the nut member, permitting the plunger's smooth sliding movement.

What is claimed is:

1. An autotensioner comprising:
    a cylinder having a closed bottom and an open top;
    a sealing member disposed in said open top of said cylinder;
    a rod slidably extending though said sealing member, said rod being formed with a helical male thread formed on an outer periphery thereof;
    a rod spring biasing said rod outwardly of said cylinder;
    a hydraulic damper provided under said rod for damping a pushing force applied to said rod; and
    a nut member axially immovably mounted in said cylinder, said nut member being formed with a helical female thread in an inner peripheral surface thereof, wherein said helical female thread of said nut member is in mesh with said helical male thread of said rod.

2. An autotensioner as claimed in claim 1, wherein said hydraulic damper comprises:
    a plunger provided at a bottom end of said rod so as to be slidable along an inner peripheral surface of said cylinder so as to define a pressure chamber under said plunger and a reservoir chamber over said plunger;
    a passage formed in said plunger for communicating said pressure chamber with said reservoir chamber; and
    a check valve provided at a bottom end of said passage and adapted to close said passage when pressure in said pressure chamber is higher than pressure in said reservoir chamber.

3. An autotensioner as claimed in claim 1, wherein said nut member comprises a sintered material and said female thread is provided at two positions which are diametrically opposite to each other.

4. An autotensioner as claimed in claim 1, wherein said cylinder is provided with hydraulic oil.

5. An autotensioner comprising:
    a cylinder having a closed bottom and an open top;
    a sealing member disposed in said open top of said cylinder;
    a rod slidably extending through said sealing member;
    a rod spring biasing said rod outwardly of said cylinder;
    a hydraulic damper provided under said rod for damping a pushing force applied to said rod;
    a screw rod mounted on said rod and being formed with a helical male thread on an outer periphery thereof; and
    a nut member axially immovably mounted in said cylinder and having a helical female thread formed in an inner peripheral surface thereof, said helical female thread being in mesh with said male thread of said screw rod,
    wherein each of said male and female threads has a pressure flank for bearing the pushing force applied to said rod, and a clearance flank, and said male and female threads have a serration-shaped section such that said pressure flank has a larger flank angle than said clearance angle.

6. An autotensioner as claimed in claim 5, wherein said hydraulic damper comprises:
    a plunger provided at a bottom end of said rod so as to be slidable along an inner peripheral surface of said cylinder so as to define a pressure chamber under said plunger and a reservoir chamber over said plunger;
    a passage formed in said plunger for communicating said pressure chamber with said reservoir chamber; and
    a check valve provided at the bottom end of said passage and adapted to close said passage when pressure in said pressure chamber is higher than pressure in said reservoir chamber.

7. An autotensioner as claimed in claim 5, wherein said nut member comprises a sintered material and said female thread is provided at two positions which are diametrically opposite to each other.

8. An autotensioner as claimed in claim 5, wherein said female thread of said nut member is comprised of two distinct thread portions which are disposed at diametrically opposite positions relative to each other.

9. An autotensioner as claimed in claim 5, further comprising a return spring disposed between said plunger and said screw rod, wherein said rod includes a small-diameter portion and a large-diameter portion, and said screw rod is slidably fitted on said small-diameter portion and is biased into engagement with said large-diameter portion by said return spring.

10. An autotensioner as claimed in claim 5, wherein said cylinder is provided with hydraulic oil.

* * * * *